(12) United States Patent
Junglas et al.

(10) Patent No.: US 10,540,756 B2
(45) Date of Patent: Jan. 21, 2020

(54) VEHICLE VISION SYSTEM WITH LENS SHADING CORRECTION

(71) Applicant: MAGNA ELECTRONICS INC., Auburn Hills, MI (US)

(72) Inventors: Michael Junglas, Elsenfeld (DE); Timor Knudsen, Freising (DE); Peter Nicke, Stuttgart (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/874,918

(22) Filed: Jan. 19, 2018

(65) Prior Publication Data

US 2018/0204310 A1    Jul. 19, 2018

Related U.S. Application Data

(60) Provisional application No. 62/448,091, filed on Jan. 19, 2017.

(51) Int. Cl.
| | |
|---|---|
| *G06T 5/00* | (2006.01) |
| *H04N 5/357* | (2011.01) |
| *H04N 5/265* | (2006.01) |
| *B60R 1/00* | (2006.01) |

(52) U.S. Cl.
CPC ............ *G06T 5/006* (2013.01); *B60R 1/00* (2013.01); *H04N 5/265* (2013.01); *H04N 5/357* (2013.01); *B60R 2300/105* (2013.01); *B60R 2300/303* (2013.01); *B60R 2300/607* (2013.01)

(58) Field of Classification Search
None
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,043,821 | A | 3/2000 | Sprague et al. |
| 2007/0297749 | A1 | 12/2007 | Ain et al. |
| 2008/0284880 | A1 | 11/2008 | Numata |
| 2008/0315865 | A1 | 12/2008 | Doogue et al. |
| 2009/0323232 | A1 | 12/2009 | Suzuki et al. |
| 2010/0045268 | A1 | 2/2010 | Kilian |
| 2011/0085729 | A1* | 4/2011 | Shi ............ H04N 5/3572 382/167 |
| 2013/0154660 | A1 | 6/2013 | Bucsa et al. |
| 2014/0333729 | A1* | 11/2014 | Pflug ............ G06T 15/20 348/47 |
| 2015/0039913 | A1 | 2/2015 | Sugiyama et al. |
| 2015/0048798 | A1 | 2/2015 | Godo et al. |
| 2016/0086317 | A1 | 3/2016 | Oron et al. |

(Continued)

*Primary Examiner* — Janese Duley
(74) *Attorney, Agent, or Firm* — Honigman LLP

(57) ABSTRACT

A vision system for a vehicle includes a camera disposed at a vehicle and having a field of view exterior of the vehicle, an image processor operable to process image data captured by the camera, and a display operable to display images derived from image data captured by the camera. The image processor, via processing of image data captured by the camera, determines a noise level in image data captured by the camera. The vision system applies a lens shading algorithm to captured image data, and the vision system adjusts a level of the lens shading algorithm responsive to the determined noise level.

20 Claims, 3 Drawing Sheets

(56) References Cited

U.S. PATENT DOCUMENTS

| | | |
|---|---|---|
| 2016/0245869 A1 | 8/2016 | Asako |
| 2017/0006282 A1 | 1/2017 | Sigle |
| 2017/0234923 A1 | 8/2017 | Douglas et al. |
| 2018/0302615 A1 | 10/2018 | Lehmann et al. |

* cited by examiner

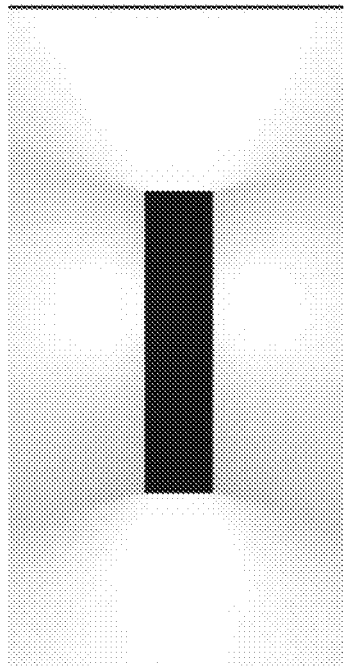
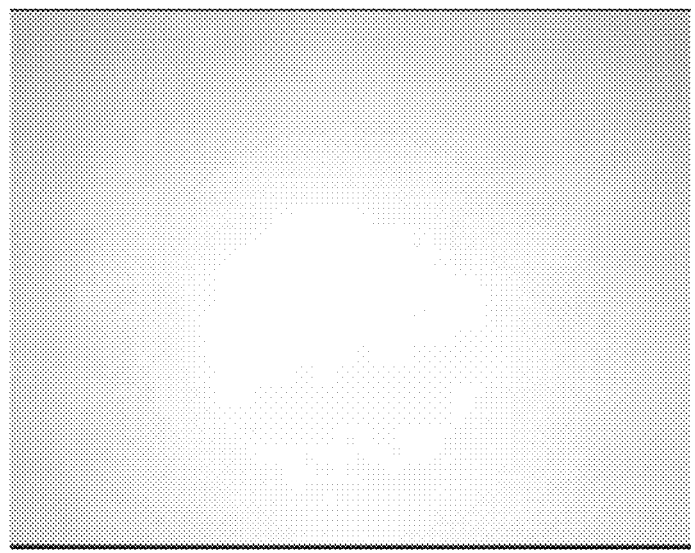
FIG. 2A                                    FIG. 2B

VEHICLE VISION SYSTEM WITH LENS SHADING CORRECTION

CROSS REFERENCE TO RELATED APPLICATION

The present application claims the filing benefits of U.S. provisional application Ser. No. 62/448,091, filed Jan. 19, 2017, which is hereby incorporated herein by reference in its entirety.

FIELD OF THE INVENTION

The present invention relates generally to a vehicle vision system for a vehicle and, more particularly, to a vehicle vision system that utilizes multiple cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes a plurality of cameras (preferably a plurality of CMOS cameras) to capture image data representative of images exterior of the vehicle, and provides a surround view display of images derived from image data captured by the cameras. An image processor processes captured image data to determine a noise level in image data captured by the camera, and the vision system applies a lens shading algorithm to captured image data. The vision system adjusts a level of the lens shading algorithm responsive to the determined noise level in the captured image data.

These and other objects, advantages, purposes and features of the present invention will become apparent upon review of the following specification in conjunction with the drawings.

BRIEF DESCRIPTION OF THE DRAWINGS

FIG. 2A is an image of a surround view display showing inhomogeneities at the stitching borders;

FIG. 2B is an image of a rear view display showing vignetting in the corners of the image;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
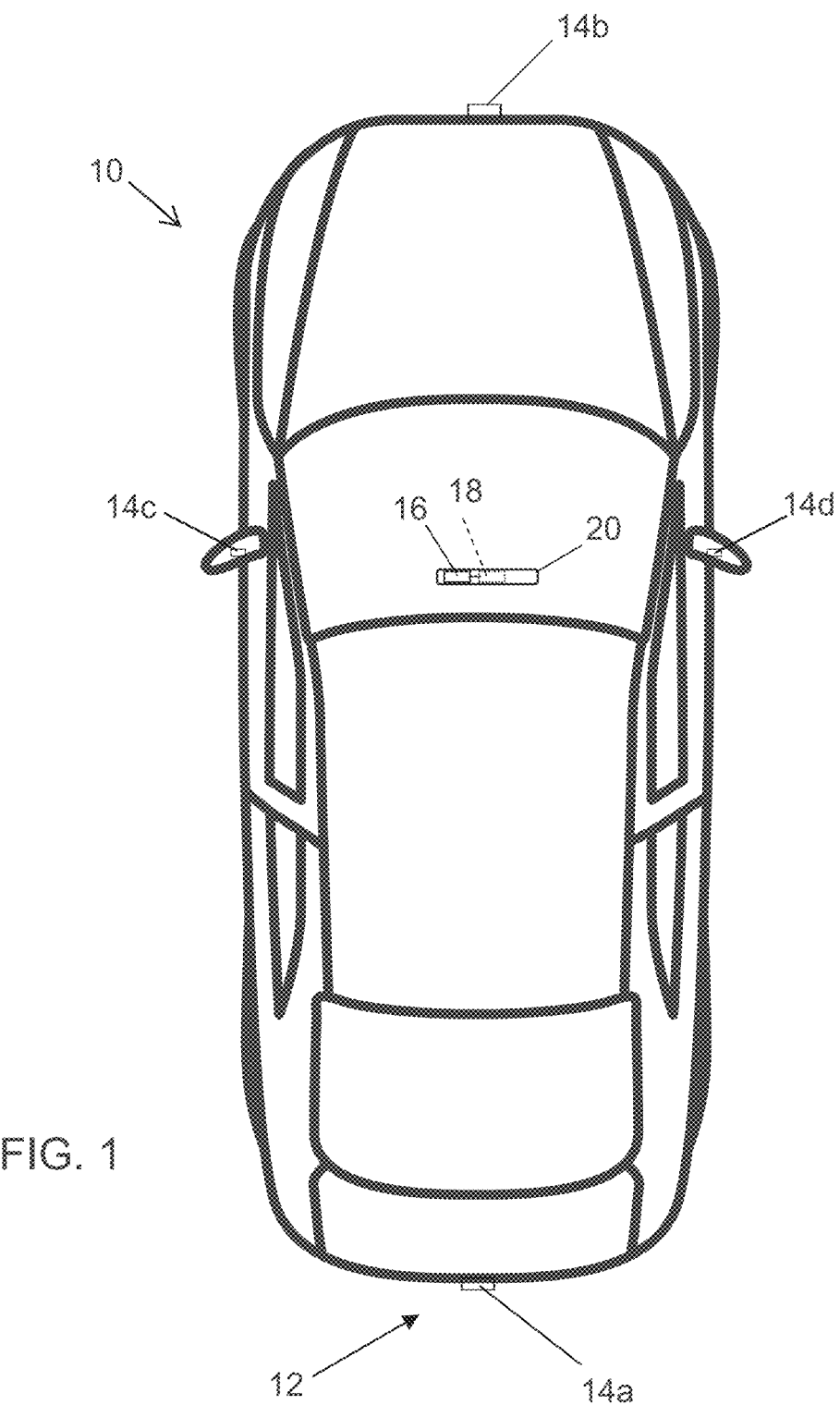
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

When providing displayed images derived from image data captured by one or more cameras of a vehicle, the system may provide vignetting (softening or shading away the edges) at the corners of a rear view fisheye eye camera images and inhomogeneity at the stitching borders of surround view or bird's eye top view images, comprising a composite image comprising images stitched together from a plurality (such as four or more) cameras. When providing vignetting or inhomogeneity, it is common to use a shading correction.

A stitched top view image and a rear view camera image capturing a bright white scene without having a shading correction is shown in FIGS. 2A and 2B. The images show vignetting in the corners of the rear view (FIG. 2B) and inhomogeneities at the stitching borders of the top view (FIG. 2A).

Figure 3A:
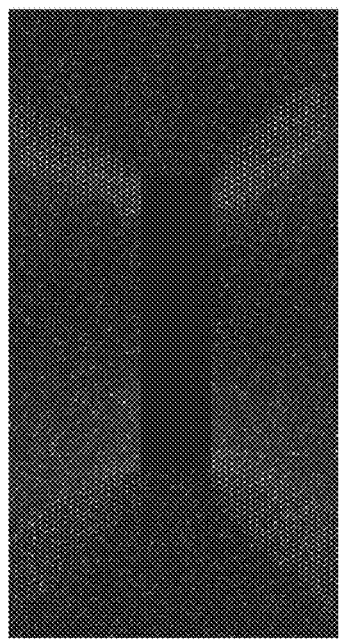
FIG. 3A is an image of a surround view display showing noise inhomogeneities at the stitching borders.
Figure 3B:
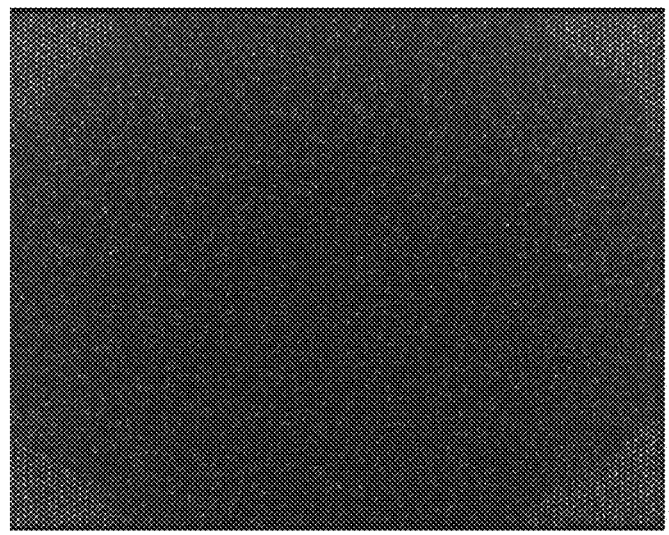
FIG. 3B is an image of a rear view display showing noise amplification in the corners of the image.

A stitched top view image and a rear view camera image capturing a low light scene with a shading correction active is shown in FIGS. 3A and 3B. The shading correction leads to an amplified noise level towards the image corners and the stitching areas. The images include noise amplification in the corners of the rear view (FIG. 3B) and noise inhomogeneities at the stitching borders of the top view (FIG. 3A).

A shading compensation works in that way: the signal gets radial-symmetrically amplified, this shows as the brightness decrease towards the corners but unfortunately also amplifies the noise.

For the blending in the stitching zones, there may be a pixel-by-pixel Alpha-blending (1−src Alpha) in use.

For reducing the negative effects so the image noise effects are acceptable at low light levels, a noise estimation algorithm is provided. Typically, it is possible to determine the noise level of a pixel or of a region of a cluster of pixels by the pixel's quadratic mean, so its energy. Below is a noise level estimation algorithm suitable for use in an FPGA algorithm out of J. Immerkaer, "Fast Noise Variance Estimation", Computer Vision and Image Understanding, Vol. 64, No. 2, pp. 300-302, September 1996. Here, a 3×3 filter gets drawn over the image, summing the pixels absolute values.

$$N = \begin{bmatrix} 1 & -2 & 1 \\ -2 & 4 & -2 \\ 1 & -2 & 1 \end{bmatrix}$$

$$\sigma_n = \sqrt{\frac{\pi}{2}} \frac{1}{6(W-2)(H-2)} \sum_{image\ I} |I(x, y) * N|,$$

The noise estimation algorithm may estimate the noise level of specific regions compared to the noise level of the whole image. Optionally, the noise estimation region may be limited to the stitching regions. As the noise level gets higher, the level of the lens shading algorithm that may be tuned is reduced. That may work in an analog way such as in a linear ratio, in a logarithmic ratio, in an exponential ratio, or in a ratio as a sum of these, such as a sum of linear and exponential portions, or otherwise statistically founded ratios or empirical found ratios. The ratio may be discontinuous, such as having three thresholds 't'. The transition zone extension may be named 'e'. The estimated noise level may be 'n'. The lens shading power may be named 'ls'. In case the noise level n for a given image is less than the transition zone e smaller than the noise level in a common or typical or baseline image (e.g., the threshold t), the lens shader ls may be tuned to 100 percent (e.g., if the noise is less than t−e). In case the noise level in the transition zone e is below a certain threshold, then the lens shader ls may be tuned to 50 percent (e.g., if the noise is greater than t−e, but is less than t+e). If the noise level in the transition zone e is above a certain threshold (t+e) then the lens shader may be tuned off.

(n<|t−e|):=100% ls;

(|t−e|<n<|t+e|):=50% ls; and (|t+e|<n):=0% ls

This measure may ensure homogeneous views in bright light and no noise inhomogeneities (or reduced noise inhomogeneities) in low light.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271;

US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera configured to be disposed at a vehicle so as to have a field of view exterior of the vehicle, said camera comprising an imager and a lens;
   an image processor operable to process image data captured by said camera;
   a display configured to be disposed in the vehicle so as to be viewable by a driver of the vehicle;
   wherein said image processor, via processing of image data captured by said camera, determines a noise level in image data captured by said camera;
   wherein said vision system applies a lens shading algorithm to image data captured by said camera;
   wherein said vision system adjusts a level of the lens shading algorithm responsive to the determined noise level; and
   wherein, with said camera disposed at the vehicle and with said display disposed in the vehicle, said display displays images derived from image data captured by said camera after the adjusted level of the lens shading algorithm is applied.

2. The vision system of claim 1, comprising a plurality of cameras configured to be disposed at the vehicle so as to have respective exterior fields of view, wherein, with said cameras disposed at the vehicle and said display disposed in the vehicle, said display displays a surround view image derived from image data captured by said cameras and stitched together to provide a composite image at said display.

3. The vision system of claim 1, wherein, responsive to an increase in the determined noise level, said vision system reduces the level of the lens shading algorithm.

4. The vision system of claim 1, wherein, responsive to the determined noise level being less than a first threshold level, the lens shading algorithm is tuned to 100 percent.

5. The vision system of claim 4, wherein, responsive to the determined noise level being greater than the first threshold level but less than a second threshold level, the lens shading algorithm is tuned to 50 percent.

6. The vision system of claim 5, wherein, responsive to the determined noise level being greater than the second threshold level, the lens shading algorithm is not applied.

7. The vision system of claim 6, wherein the first threshold level is a selected level below a baseline image level and the second threshold level is a selected level above the baseline image level.

8. The vision system of claim 1, wherein, responsive to the determined noise level being less than a threshold level, the lens shading algorithm is tuned to 50 percent.

9. The vision system of claim 1, wherein, responsive to the determined noise level being greater than a threshold level, the lens shading algorithm is not applied.

10. The vision system of claim 1, wherein said image processor, via processing of image data captured by said camera, determines the noise level at selected regions of the captured image data that are less than the entirety of a frame of captured image data.

11. A vision system for a vehicle, said vision system comprising:
    a plurality of cameras configured to be disposed at a vehicle so as to have respective fields of view exterior of the vehicle, each of said cameras comprising an imager and a lens;
    an image processor operable to process image data captured by said cameras;
    a display configured to be disposed in the vehicle so as to be viewable by a driver of the vehicle;
    wherein said image processor, via processing of image data captured by said cameras, determines a noise level in image data captured by each of said cameras;
    wherein said vision system applies a lens shading algorithm to image data captured by said cameras;
    wherein said vision system adjusts a level of the lens shading algorithm responsive to the determined noise level;
    wherein, responsive to the determined noise level being greater than an upper threshold level, the lens shading algorithm is not applied;
    wherein, with said cameras disposed at the vehicle and said display disposed in the vehicle, said display displays a surround view image derived from image data captured by said cameras and stitched together to provide a composite image at said display; and
    wherein the displayed surround view image is derived from image data captured by said cameras after the adjusted level of the lens shading algorithm is applied.

12. The vision system of claim 11, wherein, responsive to an increase in the determined noise level, said vision system reduces the level of the lens shading algorithm.

13. The vision system of claim 11, wherein, responsive to the determined noise level being less than a first threshold level, the lens shading algorithm is tuned to 100 percent, and wherein the first threshold level is less than the upper threshold level.

14. The vision system of claim 13, wherein, responsive to the determined noise level being greater than the first threshold level but less than a second threshold level, the lens shading algorithm is tuned to 50 percent.

15. The vision system of claim 14, wherein the second threshold level is the upper threshold level.

16. The vision system of claim 15, wherein the first threshold level is a selected level below a common image level and the second threshold level is a selected level above the common image level.

17. The vision system of claim 11, wherein said image processor, via processing of image data captured by said camera, determines the noise level only at stitching regions of the captured image data.

18. A vision system for a vehicle, said vision system comprising:

a plurality of cameras configured to be disposed at a vehicle so as to have respective fields of view exterior of the vehicle, each of said cameras comprising an imager and a lens;

an image processor operable to process image data captured by said cameras;

a display configured to be disposed in the vehicle so as to be viewable by a driver of the vehicle;

wherein said image processor, via processing of image data captured by said cameras, determines a noise level in image data captured by said camera;

wherein said vision system applies a lens shading algorithm to image data captured by said cameras;

wherein said vision system adjusts a level of the lens shading algorithm responsive to the determined noise level;

wherein, with said cameras disposed at the vehicle and said display disposed in the vehicle, said display displays a surround view image derived from image data captured by said cameras and stitched together to provide a composite image at said display;

wherein the displayed surround view image is derived from image data captured by said cameras after the adjusted level of the lens shading algorithm is applied;

wherein, responsive to an increase in the determined noise level, said vision system reduces the level of the lens shading algorithm;

wherein, responsive to the determined noise level being less than a first threshold level, the lens shading algorithm is tuned to 100 percent; and wherein, responsive to the determined noise level being greater than the first threshold level but less than a second threshold level, the lens shading algorithm is tuned to 50 percent.

19. The vision system of claim 18, wherein the first threshold level is a selected level below a common image level and the second threshold level is a selected level above the common image level.

20. The vision system of claim 18, wherein said image processor, via processing of image data captured by said camera, determines the noise level only at stitching regions of the captured image data.

* * * * *